US006662270B1

United States Patent
Sans et al.

(10) Patent No.: US 6,662,270 B1
(45) Date of Patent: Dec. 9, 2003

(54) SYSTEM AND METHOD FOR CACHING OF REUSABLE OBJECTS

(75) Inventors: Charles Sans, Rolling Hills Estates, CA (US); Jean-Yves Bouche, Sergy (FR)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/571,831

(22) Filed: May 16, 2000

(51) Int. Cl.[7] .......................... G06F 12/02; G06F 17/30
(52) U.S. Cl. ...................................................... 711/118
(58) Field of Search ................................ 711/138, 145, 711/163, 118, 113; 395/101; 358/1.15, 1.9, 1.16; 707/104; 709/203; 715/514, 515

(56) References Cited

U.S. PATENT DOCUMENTS

| | | | |
|---|---|---|---|
| 5,402,527 A | * 3/1995 | Bigby et al. | 395/101 |
| 5,416,896 A | * 5/1995 | Motoyama | 715/514 |
| 5,535,318 A | * 7/1996 | Motoyama et al. | 715/514 |
| 5,748,860 A | * 5/1998 | Shively | 358/1.15 |
| 5,897,634 A | * 4/1999 | Attaluri et al. | 711/113 |
| 6,389,462 B1 | * 5/2002 | Cohen et al. | 711/113 |
| 6,418,448 B1 | * 7/2002 | Sarkar | 707/104.1 |
| 6,424,993 B1 | * 7/2002 | Weber | 709/203 |
| 6,441,919 B1 | * 8/2002 | Parker et al. | 711/113 |

FOREIGN PATENT DOCUMENTS

CA    2347221 A1 * 11/2001    ............ G06F/12/02

OTHER PUBLICATIONS

Adobe Systems Inc, "PostScript Language Reference Manual $2^{nd}$ Edition", 1990, Addison–Wesley Publishing Co, pp. 9, 69–71, 170, 480, 487, 585–588.*

* cited by examiner

Primary Examiner—Pierre-Michel Bataille
(74) Attorney, Agent, or Firm—Jeannette M. Walder

(57) ABSTRACT

A system and method for enabling implementation-transparent caching of reusable objects in an application program using a language, which may be a page description language, with defined operators is described. A default operator from the language, which supports a set of default caching operations is selected. A set of additional caching operations for use in a specific caching implementation is created. The set of additional caching operations is associated with the defined operator. A key for selecting between the set of default caching operations and the set of additional caching operations is also defined. When the application program is executed, the application program automatically selects the set of default caching operations or the set of additional caching operations based on the value of the key.

16 Claims, 3 Drawing Sheets

SYSTEM AND METHOD FOR CACHING OF REUSABLE OBJECTS

FIELD OF THE INVENTION

This invention relates generally to a system and method which enables pre-rasterization and caching of reusable objects in page description languages.

BACKGROUND OF THE INVENTION

Page description language (PDL) is a language which allows the appearance of a printed page (such as how to form the type and graphic elements on it) to be described in a high-level, device-independent way. Rather than download a font to the printer, for example, the PDL gives the printer instructions on how to draw each character from outlines; graphics are produced in a similar way. Printing then becomes a two-stage process: an application program produces a description of the document in the page description language, which is then interpreted by a specific output device. A page description language can therefore serve as an interchange standard for transmission and storage of printable documents. Examples of PDLs include Adobe Systems, Inc.'s PostScript or Xerox's Interpress.

Many production printing jobs, such as utility bills and bank statements, contain variable data on a template or form. In a production printing job, the PDL application program produces a description of each page of the document. If the same text or graphic elements repeat from page to page, the application program must produce a description of the repetitive text or graphics elements for each page, which is sent to the raster image processor (RIP) for generating the image. Generating the same images for each page takes time. In the case of production printing of jobs containing variable data and forms on monochrome printers, the performances of the RIPs has been good enough to maintain a speed compatible with the needs of production printing. But with the introduction of fast, full color printers suitable for production speeds of 35 pages per minute and up, the situation changed. The amount of data to be processed for each page may be quite large. To maintain productivity the RIP speed must at least match the printer speed. In color production jobs, this has been possible only with performance improvement techniques such as pre-rasterization and caching.

PDLs, such as Adobe PostScript, purport to contain defined operators to enable caching and pre-rasterization. Unfortunately, the specifications for these mechanisms are not precise enough, or they are inconsistent in different applications or they frequently include limitations. As a result, the standard PostScript operators cannot be used to efficiently manage resources or to enable pre-rasterization and caching. To overcome this problem, some vendors have modified the PostScript interpreters and augmented the standard set of PostScript operators with a set of new, proprietary operators. The proprietary operators usually provide very similar functionality to the standard ones, but not the same functionality. The rational being that since the new set of operators is proprietary, their functionality can be defined as wanted.

The problem with proprietary operators is that each vendor uses its own set of operators and thus user applications sending print files to the output devices need to accommodate each set of proprietary operators. Furthermore, if a "PostScript" file containing the proprietary operators is sent to a fully compliant PostScript interpreter (i.e., one which does not implement the functions called by the proprietary operators), the job will abort with an error. In other words, the advantages of using a "standard" PDL are lost.

SUMMARY OF THE INVENTION

In accordance with the invention, a system and method for enabling implementation-transparent caching of reusable objects in an application program using a language, which may be a page description language, with defined operators is described. A default operator from the language, which supports a set of default caching operations is selected. A set of additional caching operations for use in a specific caching implementation is created. The set of additional caching operations is associated with the defined operator. A key for selecting between the set of default caching operations and the set of additional caching operations is also defined. When the application program is executed, the application program automatically selects the set of default caching operations or the set of additional caching operations based on the value of the key.

The invention is particularly applicable to page description languages such as Adobe PostScript and other printer control languages. A PDL such as Adobe PostScript defines four operators to invoke default caching operations: defineresource, resourcestatus, findresource and execform. This set of caching operations enables caching to be performed to some extent. For example, it enables caching using virtual memory, but not external sources. If a reusable object such as a form is to be used from one job to another, it cannot be stored. Stored forms may not be modified during a print job. The invention enables the use of external caching resources, storing a reusable object for reuse across multiple jobs and modifying a stored reusable object (such as by scaling or rotation).

When a print job is sent to a printer using the invention, the application program uses the key to automatically determine if the set of default caching operations is to be used or if the set of additional operations is to be used. In this way, the actual caching implementation is transparent to the user. The user sends his job to a printer. If the additional caching operations are implemented, the print job proceeds quickly. If not, the print job takes longer to complete. Furthermore, the method described here will allow some PDLs, such as PostScript, to ignore the selection of additional operations (and thus use default ones) when they are not implemented. In this case, the caching implementation is even transparent to the application program.

The system and method of the invention provides a well-defined way to improve performance of a page description language interpreter in a PDL based printer controller and other devices or applications using the standard set of PDL operators.

DETAILED DESCRIPTION OF THE PREFERRED EMBODIMENT

The following description will focus on a preferred embodiment of the present invention which is operative in the Adobe PostScriptrm™ (PS) page description language as implemented by the Variable-data Intelligent Postscript Printware (VIPP), a high level language to access PS interpreter functionalities for enabling pre-rasterization and caching of reusable objects. The present invention, however, is not limited to any particular language or any particular page description language. Instead those skilled in the art will find that the system and methods of the present invention may be advantageously applied to a variety of languages including page description languages. Therefore, the description of the exemplary embodiment which follows is for purposes of illustration and not limitation.

The "PostScript Language Reference Manual, Second Edition" (PLRM) section 3.9 introduces the notion of "named resources" and describes it as follows: "During execution, The PostScript program requests the objects by name. The interpreter loads them into VM [virtual memory] automatically from an external source, such as a disk file, a ROM cartridge, or a network file server." Five PostScript operators support the implementation of this concept: findresource, resourcestatus, resourceforall, defineresource, and undefineresource.

Section 4.7 of the PLRM also introduces the usage of "Forms" and describe them as follow: "a self-contained description of any arbitrary graphics, text, or sampled images that are to be painted multiple times, either on several pages or at several locations on the same page." "Forms" are, for this embodiment, the same as reusable objects. Later on the same section, a set of basic rules is provided to describe the differentiation of an ordinary procedure and a form and the advantages of using forms is described as follow: "These rules permit the PostScript interpreter to save the graphical output of the form in a cache. Later, when the same form is used again, the interpreter substitutes the saved output instead of re-executing the form's definition. This can significantly improve performances when the form is used many times." One PostScript operator, execform, is provided to support usage of forms.

VIPP was modified in accordance with the invention to take advantage of resource management and caching available on PostScript to provide a precise specification of the expected behavior of the existing PostScript operators: defineresource, resourcestatus, findresource and execform to make external resources available for caching, to enable reusable objects (Forms) to be reused across jobs and output devices and to enable modification of some stored reusable objects. Since the standard PostScript operators are maintained (such that the operators can be used in their default configuration), a PostScript job coded to take advantage of resource caching sent to a PostScript interpreter without resource caching will be processed without error.

Figure 1:
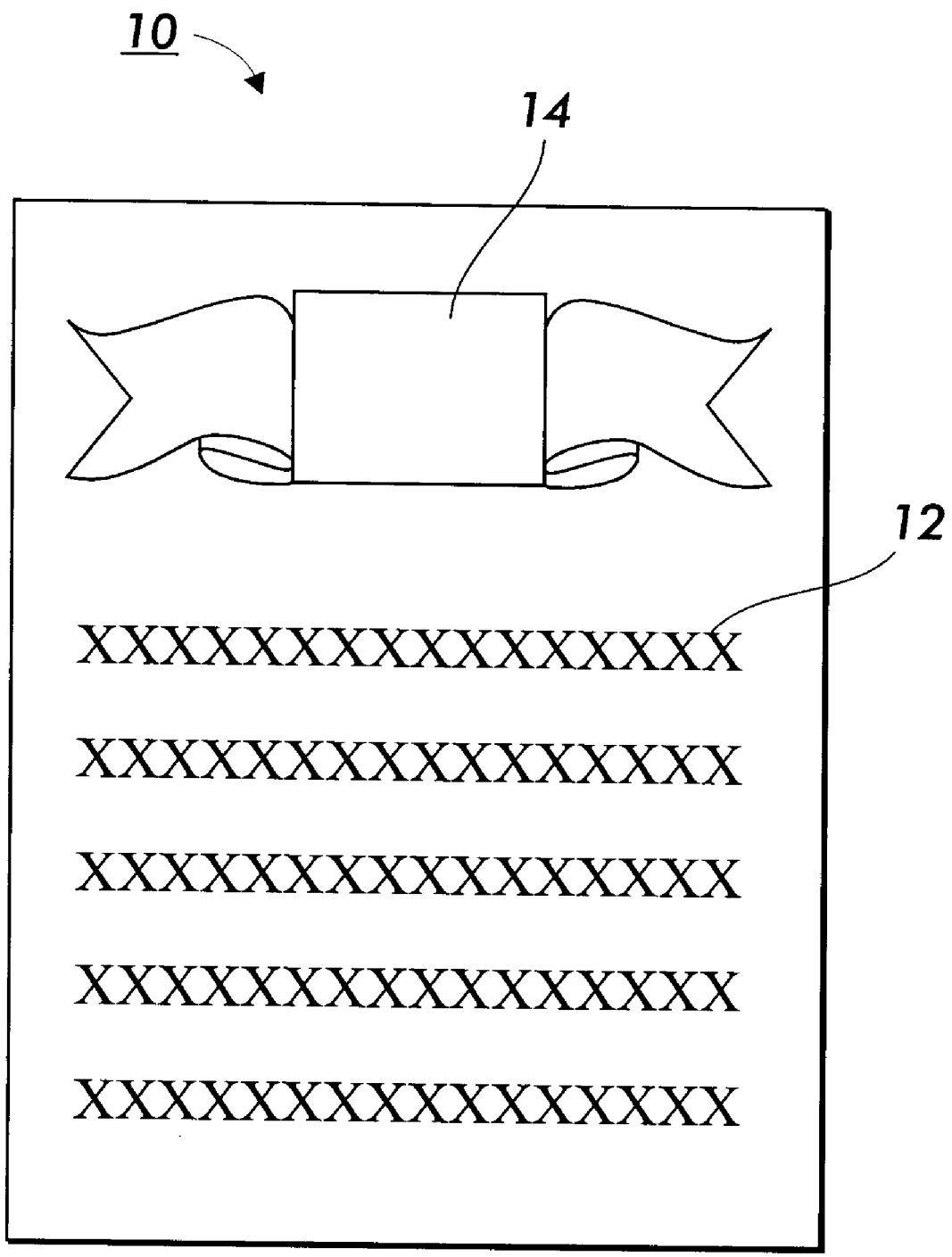
FIG. 1 is a diagram of a document including form data and variable data.

FIG. 1 shows a typical document 10 for printing which includes form data 14 and variable data 12. In a typical print job, the form data 14 is a likely candidate for a reusable object, which can be stored for reuse during a single print job, and stored for later use on other jobs.

Figure 2:
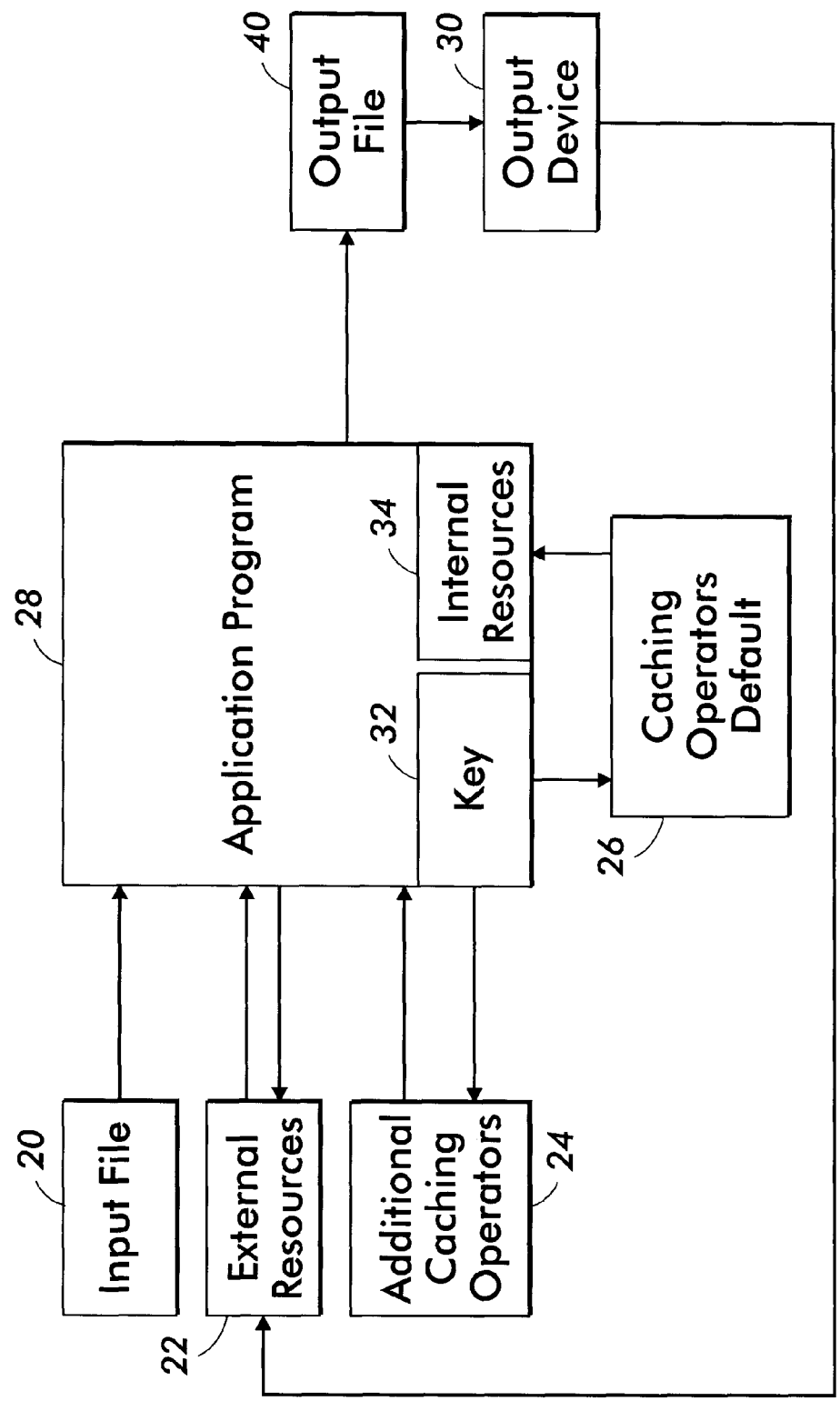
FIG. 2 is a block diagram illustrating a system according to the invention.

Referring to FIG. 2, an application program 28 employing a language, such as Adobe PostScript, with defined operators for caching 26, is shown. If an input file (a print job) 20 is provided to the application program 28 for interpretation into an output file 40, the application program 28 has the choice of implementing the default caching operators 26 or the additional caching operators 24. The additional caching operators 24, in this system, enable the use of external resources 22 for storage and modification of reusable objects. Since external resources 22 are available in this system, key 32 has been automatically set within application program 28 to select the additional caching operators 24. The application program 28 uses the external resources 22 to store reusable objects or to reference previously stored reusable objects with the output file 40. If external resources 22 were not available, the default caching operators 26 only enable use of internal resources (typically virtual memory) for storing reusable objects.

When the output file 40 is generated it contains a reference to a series of reusable objects stored on external resource 22. When the output file 40 is sent to output device 30, output device 30, if it is a printer, does not have to pre-rasterize or store any of the reusable objects which are referenced as stored in external resource 22. Output device 30 can access those reusable objects during the actual print job.

Figure 3:
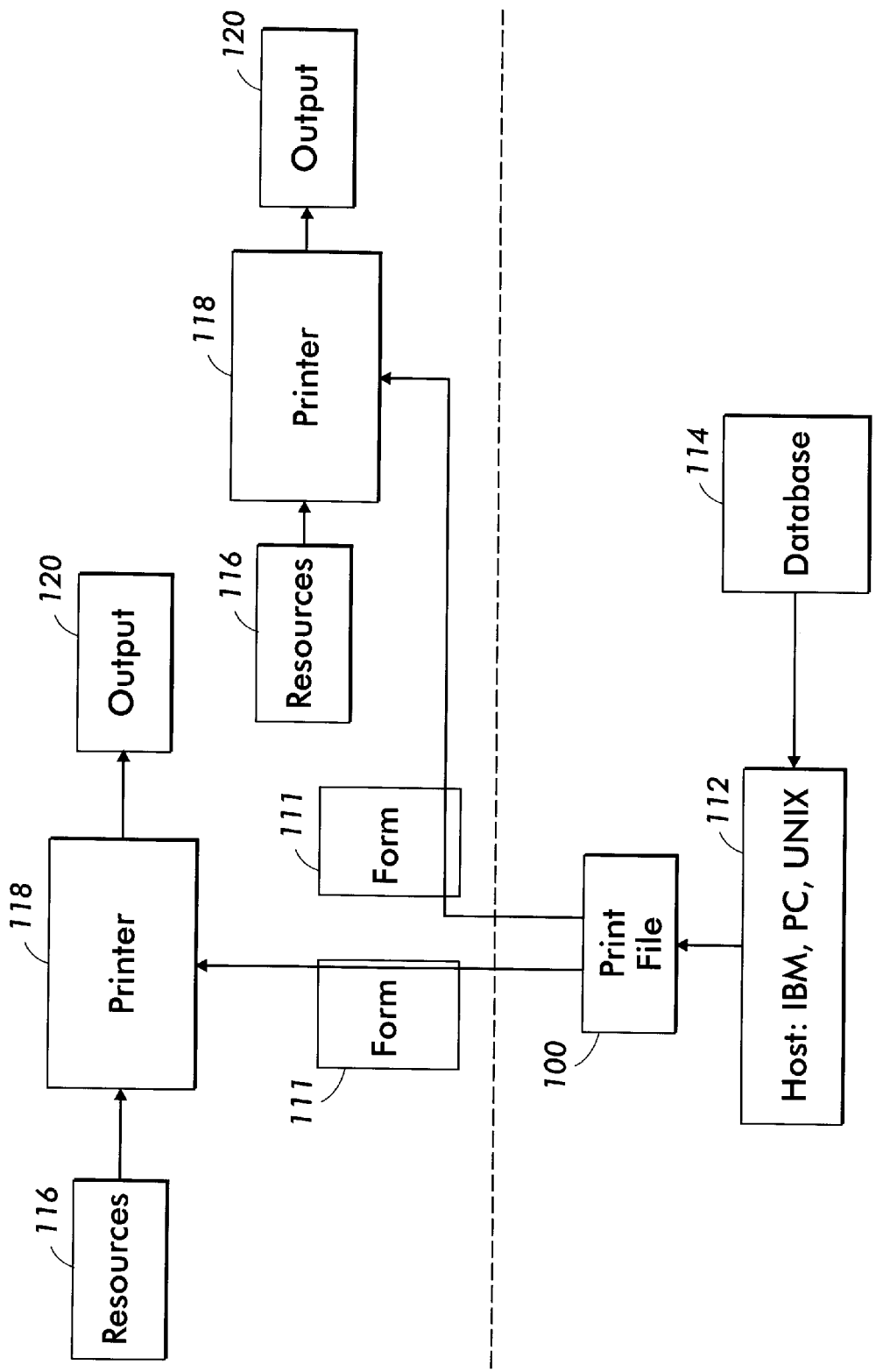
FIG. 3 is a block diagram of a network including multiple printer devices implementing the system of the invention.

Referring to FIG. 3, a network host 112, which may be any network host or workstation (e.g., IBM, UNIX, or a personal computer) includes an application program 28 (not shown) which accesses an input file from a database 114 for generation of an output print file 100. In this example, the application program generates a series of reusable objects (FORMs) 111, which may be sent as part of the print file 100 to output devices 118. Each output device includes its own external resource 116 for storing the FORMs 111 for use in generating the print job output 120. By sending the pre-rasterized forms with the print file, the output device can use its own external resources for caching, thereby avoiding the timely procedure of pre-rasterizing each form for each page and improving performance.

The foregoing has been implemented in the VIPP specification for pre-rasterization and caching of reusable objects as applied to the Adobe PostScript™ language described below. This specification enables document component re-use, at the job level or across jobs, and describes the mechanisms required on the printer controllers to enable them.

Vipp Specification

Terminology. Reusable Object means generally an image, text or graphic element (or a combination of these) used more than once in a job or across jobs. Variable data means generally an image, text or graphic (or a combination of these) used only once in a job or whose contents may vary during the job.

VIPP as modified supports reusable objects in two ways: reusable objects within a job and reusable objects across jobs. The PostScript mechanisms (default caching operators) on which VIPP relies to implement these features are described in the following sections.

Reusable Objects within a Job. In this scenario, reusable objects are defined "on the fly" during the job, ripped only once and discarded after job completion. VIPP uses the PostScript operator execform to implement this feature. execform specifies a method to define and call a reusable object (a "Form" in the PostScript terminology) within a job and enable the PostScript interpreter to rip the object only once, save the associated raster data and re-use it on subsequent calls to the same object.

In this case reusable objects do not need to be registered since their lifetime is limited to the lifetime of the job. Raster data can be kept in memory or written to a temporary external storage (or a mix of both) depending on its size and the memory management policy. The PLRM, in section 4.7, describes a PostScript form as follows: "A self-contained description of any arbitrary graphics, text or sampled images that are to be painted multiple times on each of several pages or several times at different location on a single page." Such a description (a piece of PostScript code) is built in a specific structure called a Form dictionary. The Form dictionary is passed as an argument to the execform operator. The first time execform executes a form it will rip the PostScript code, store the raster data and add a reference to it in the form dictionary (/Implementation key). For all subsequent executions of the same form, execform will not rip the code again but fetch the raster data instead.

PostScript code example:

<</FormType 1

/BBox [0 0 595 841]

/Matrix [1 0 0 1 0 0]

/PaintProc { . . . PS code . . . }

>>execform

The raster data could be in any format appropriate and optimized for a specific interpreter/device and this format could be completely different across systems since it is considered as "implementation dependent" and completely transparent to VIPP. This addresses the requirements for the mechanism described in this section.

VIPP Commands. The following set of VIPP commands support reusable objects within a job: SETFORM, SETBFORM, SCALL. It should be noted that not all VIPP resources are candidates for caching. For instance, a VIPP form or segment may contain variables and thus have a different content from page to page. For this reason VIPP provides specific commands (to be combined with those above) to indicate when a resource can be cached. For example, a VIPP form will be cached (executed with execform) only when terminated by FSHOW.

Reusable Objects across jobs. In this scenario reusable objects are defined globally as "external resources" and shared by all jobs. This implies two steps and thus two mechanisms. (1) Pre-caching workflow: during this step, a reusable object is submitted on its own to the PostScript interpreter or to any digital front end (DFE) dedicated application to be pre-ripped and stored as an external resource available for subsequent jobs. (2) Pre-cached object referencing in a subsequent print run an external resource is referenced and retrieved from external storage and imaged on the page.

Pre-caching implementation. Through the PostScript interpreter: VIPP provides an additional command and appropriate syntax to allow a VIPP resource to be sent to the PostScript interpreter for pre-ripping and storage as an external resource. This command will be used mainly by dedicated applications to automate the pre-caching workflow or by generic VIPP utilities to provide a unified pre-caching workflow for heterogeneous systems. VIPP uses the PostScript operator defineresource with the Form category to implement this feature. This PostScript operator specifies a method to create and register reusable objects in virtual memory (VM) but does not provide specification on how to define it on external storage. For this purpose VIPP extends the Form dictionary optional keys with a Boolean to key called /FormCache. When set to 2 in the Form dictionary this key instructs the defineresource operator to pre-rip and store the object on external storage. The key parameter specified by the defineresource syntax will be used as the name of the object on external storage.

PostScript code example:

/MyForm

<</FormType 1

/BBox [0 0 595 841]

/Matrix [1 0 0 1 0 0]

/PaintProc { . . . . PS code . . .}

/FormCache 2

>>/Form defineresource

This may also be implemented through a DFE application Pre-Cache utility that will allow an operator to submit a particular object for pre-caching, which may ingest not only PostScript format (EPS) but also other non PostScript format (TIFF, JPEG, etc.). The name of the original object will be retained as the name of the pre-ripped object on external storage.

Pre-cached object referencing implementation. VIPP uses the PostScript operators resourcestatus, findresource and execform to implement this feature. These operators specify a method to access and execute reusable objects on external storage. The specification of findresource states: "If the requested resource instance is not currently in VM (memory space available to the interpreter), findresource attempts to obtain it from an external source. The PostScript language does not specify the way this is done; it varies among different implementations. The effect of this action is to create an object (Form) in VM and . . . returns the newly created object." When requested to access a named resource (e.g., (MyForm) SETFORM) VIPP applies the following algorithm until the resource is found:

Query the VIPP internal resource dictionary;

Query the pre-cache external storage using resourcestatus;

Query the VIPP resources libraries (formlib, imglib).

If the resource is present in the internal dictionary VIPP retrieves it from the internal dictionaries applies execform on it. Else, if resourcestatus returns true VIPP retrieves the resource from external storage using findresource, stores the returned Form dictionary in the internal resource dictionary and applies execform on it Finally, if both actions fail, VIPP looks for the resource in the VIPP resource libraries, retrieves it, converts it to a Form dictionary (if required), stores it in the internal resource dictionary and applies execform on it.

PostScript code example for second query:

(MyForm)/Form resourcestatus

{ pop pop (MyForm)/Form findresource

XGFResDict (Myform) 2 index put execform

} if

VIPP Commands. The following set of commands support reusable objects defined as "external resources": SETFORM, SETBFORM, SCALL, ICALL.

Resource management. The file structure and access mechanisms to support reusable objects on external storage is generally implementation dependant, but of little concern to VIPP since it will only communicate with the external storage using the defineresource and findresource operators and a resource name. Resource management on external storage will be provided by two mechanisms: Resource management through a DFE application and Resource management through PostScript operators.

Resource management through a DFE application. DFE vendors may provide a resource management utility that will allow an operator to perform the various management tasks on resources (delete, move, copy, rename, show properties, etc) through a user interface.

Resource management through PostScript operators. These operators will be used mainly by dedicated applications to automate the resource management or by generic VIPP utilities to provide a unified resource management for heterogeneous systems. The resourceforall operator will be used to obtain a list of resources currently available on the system. The resourcestatus operator will be used to obtain information like the size and the status of the resource.

When a reusable object is cached, the raster data created by execform is linked to the current graphic state (scaling, rotation, etc.). On subsequent executions of the same object the graphic state must be the same in order to allow execform to use the raster data. If this is not the case the execform specifications state that the object will be ripped again. If the application requires the same object to be cached with different graphic states then several different objects must be defined and cached independently. Only changes in rotation, scaling and placement (horizontal/vertical positions) between calls are supported.

VIPP language extensions.

CACHE Command. CACHE is a new command that enables resource caching. CACHE delivers a form dictionary on the stack that is intended to be used as an argument by SETFORM, SETBFORM or SCALL. For this reason it must be combined with one of these three commands (see syntax examples in sections 3 and 4 below). CACHE takes a file name as argument and search for it in sequence in the following locations:

PostScript™ Forms directory (the directory where the DFE is storing Form resources) using findresource (access to pre-cached, pre-loaded and "already accessed" resources).

VIPP formlib resource library as defined by SETFPATH (first access).

VIPP imglib resource library as defined by SETIPATH (first access).

VIPP mislib resource library as defined by SETMPATH (first access). If the resource is found in one of the VIPP resource libraries a form dictionary including the PaintProc: { (filepath/filename) run } is created behind the scene and registered using defineresource in the PostScript Forms directory (using "filename" as the registration key). Thus subsequent calls to the same resource will retrieve it with findresource.

/CACHE option for XGFRESDEF. XGFRESDEF syntax is extended with the /CACHE option that will transform the argument procedure into a form dictionary and register it in the PostScript Forms directory with the PostScript operator defineresource. This extension is intended to serve two purposes: in-job definition of in-line forms or segments that require caching and incorporation of forms and segments that require caching by the "deplpr " process.

SETFORM/SETBFORM and SCALL receive the following extensions. In addition to filename and { form contents }, a form dictionary will be supported as argument (support of "reusable object within a job" through the CACHE command). filename will be searched for in PostScript Forms directory prior to the VIPP formlib library (support of "reusable object across jobs" also called "pre-caching"). During execution of SETFORM/SETBFORM the FSHOW command will be redefined so that the form procedure will be transformed into a form dictionary. The second extension will allow pre-cached resources to be caught by SCALL and SETFORM/SETBFORM calls even if CACHE is not used. Thus existing applications that do not yet use the CACHE command will benefit of the caching without any modification by simply downloading resources with pre-cached option.

PRECACHE is a new command that enables resource pre-caching. PRECACHE is a standalone command and does not deliver anything on the stack. It takes a file name as argument and search for it in sequence in the following locations:

VIPP formlib resource library as defined by SETFPATH.

VIPP imglib resource library as defined by SETIPATH.

VIPP mislib resource library as defined by SETMPATH.

If the resource is found, a form dictionary including the PaintProc: { (filepath/filename) run } is created behind the scene and registered using defineresource in the external printer or DFE resource library using "filename" as the registration key. Thus subsequent calls to the same resource will retrieve it with findresource. These calls may be initiated from the same job or from jobs submitted subsequently. An additional parameter provides the list of rotation/scale combinations required for pre-rendering. For each of these combinations a specific image of the resource is pre-rendered and stored in the external library. If the resource already exists in the external resource library, all pre-rendered instances of this resource are discarded (see section "expected behavior of PostScript operators" for implementation details). Once a form has been pre-cached the original file may be removed from the VIPP resource library. The following syntax is used to pre-cache EPS or PostScript files (created by PostScript drivers) or TIFF files to be used latter as cached forms or segments.

(filename) [rot1 scal rot2 sca2 . . . rotN scaN ] PRE-CACHE

Calling VIPP resources (.frm, .seg). Such forms and segments are generally coded using VIPP commands or user written PostScript code that does not include in-line images. PostScript files created by drivers are generally not suitable for VIPP forms and segments because they are either too big or contain in-line images.

VIPP Forms. The following syntax is used to call forms encoded according to the VIPP syntax for forms (starting by the "{"character and ending with the "}" character or "} FSHOW" sequence).

(form1.frm) SETFORM (form1.frm) SETBFORM or (form1.frm) planenumber [c1 c2 . . . cn] SETFORM (form1.frm) planenumber [c1 c2 . . . cn] SETBFORM or

[ (form1.frm)(form2.frm) ] SETFORM

[ (form1.frm)(form2.frm) ] SETBFORM

The use of caching is controlled through the command FSHOW at the end of the VIPP form. If FSHOW is present, caching will be used. If FSHOW is NOT present caching will NOT be used.

The following syntax is used to call VIPP segments that require caching.

(seg1.seg) CACHE SCALL or (seg1.seg) CACHE scale SCALL

The use of the caching is controlled through the command CACHE. If CACHE is present, the segment will be cached. If CACHE is NOT present, the segment will NOT be cached.

Calling PostScript resources (.ps, .eps) (created by drivers) and TIFF files as forms or segments. In both cases the use of the caching is controlled through the VIPP command CACHE. This command is mandatory with these syntaxes. Note that EPS, PostScript or TIFF are interchangeable in both syntaxes. However, EPS is recommended rather that PostScript as the best choice.

The following syntax examples are used to call EPS or PostScript files (created by drivers) or TIFF files as forms:

(doc1.ps) CACHE SETFORM (doc1.ps) CACHE SETBFORM or (doc1.ps) CACHE planenumber [c1 c2 . . . cn] SET-FORM (doc1.ps) CACHE planenumber [c1 c2 . . . cn] SETB-
FORM or

[(doc1.ps) CACHE (form1.frm) ] SETFORM

[(doc1.ps) CACHE (form1.frm) ] SETBFORM

The following syntax examples are used to call EPS or PostScript files (created by drivers) or TIFF files as segments:

(doc1.eps) CACHE SCALL or (doc1.eps) CACHE scale SCALL

The following syntaxes are used to define forms or segments coded with VIPP commands as part of the SETFORM, SETBFORM or SCALL commands (in-line resources).

The following syntaxes will NOT support caching (no key for caching):

{ . . . VIPP code . . . } SETFORM

{ . . . VIPP code . . . } SETBFORM

{ . . . VIPP code . . . } SCALL

The following syntaxes use in-job resource definitions to cache in-line forms or segments:

/rname { . . . VIPP code . . . } /CACHE XGFRESDEF or

/rname { . . . VIPP code . . . }[llx lly urx ury]
/CACHE XGFRESDEF

The resource will be cached and registered with the key /rname. These sequences must appear outside of a page definition and must be executed only once in the job otherwise the resource will be cached multiple times. [llx lly urx ury ] define the bounding box of the resource and is optional. If not present it will default to [0 0 pagewidth pageheight]. The cached resources can then be called using the following syntaxes:

(rname) SETFORM (rname) SETBFORM or (rname) SCALL and all the variants documented in the VIPP 2.1 Reference Manual.

The XGFRESDEF command is used to embed resources in a VIPP print job. These resources are retained in the printer memory only for the duration of the job. Such print jobs (known as "deplpr" or self-contained VIPP jobs) may be created by VIPP emitters for the following purposes: forward VIPP jobs to printers without permanent resources storage capabilities; proof print jobs in the design phase for which the resources have not yet been downloaded; temporarily "obscure" resident resources (for the duration of the job); embed critical resources (signature) within the print job to avoid permanent storage (security). The following syntaxes are used to pre-load and cache resources on the printer memory.

VIPP Forms:

/form1.frm

{ . . . PS or VIPP code . . . }

FSHOW XGFRESDEF

VIPP Segments:

/seg1.seg

MAKEVMFILE

. . . PS or VIPP code . . .

%%EOD$_{13}$ XGF /CACHE XGFRESDEF

PostScript Forms:

/doc1.ps

MAKEVMFILE

. . . PS code . . .

%%EOD_XGF /CACHE XGFRESDEF

PostScript Segments:

/doc1.eps

MAKEVMFILE

. . . PS code . . .

%%EOD_XGF /CACHE XGFRESDEF

The following prerequisites must be kept in mind when requesting caching for a resource. A cached resource must be self-contained. That is it must not contain or depend on any variable element or setting that may vary from one call to another. If this happens the resource will always reflect the state at the first call or at pre-caching time. The only transformations allowed between subsequent calls to the same resource are translation, rotation and scaling.

There are four PostScript operators on which the VIPP caching implementation will rely: defineresource, resourcestatus, findresource, execform.

resourcestatus. The expected behavior of resourcestatus is exactly what is described in the Adobe documentation (PostScript Language Reference 3rd edition).

findresource. The expected behavior of findresource is based on the Adobe documentation with more detailed specifications regarding the processing of Forms as external resources. When findresource is executed two situations are considered: (1) the form is already in VM (either explicitly created by defineresource or loaded by a previous execution of findresource), in that case findresource will just push the form dictionary on the stack and (2) the form is not in VM but exists on external storage as a pre-cached form. findresource will access the form object on external storage, create the form dictionary in VM (execute defineresource) and push it on the stack. In addition it will establish a link between the form dictionary in VM and the form object on external storage so that subsequent executions of execform on this form dictionary will behave as described below. External storage (pre-cached forms for the purpose of this document) is implementation dependant. Adobe only describes the syntax for these commands but the implementation is proprietary.

execform. The expected behavior of execform is based on the Adobe documentation. That includes the mechanisms to cache the image rendered by the PaintProc and reuse it in subsequent execution of the same form. However Adobe specifications state that the PaintProc must be re-executed (and a new cached image created) whenever the graphic state has changed between two executions of the same form. VIPP specifications assume that the PaintProc is self-contained and independent of the graphic state except for the rotation and scaling parameters of the CTM. Thus the PaintProc will only be re-executed when one or both of these two parameters change between two executions of the same form. In addition, in order to improve caching efficiency, each cached image resulting of a different rotation/scale combination will be kept during the lifetime of the job (or across jobs in case or pre-cached forms) so that it can be re-used whenever the form is called again with that combination. For compatibility purpose with regular PostScript jobs it is assumed that both implementations of execform (one matching Adobe's and one matching VIPP specifications) will be available in the interpreter. To select which implementation is required by a given execution of execform the list of entries in a form dictionary is extended with the following keys:

| Key | Type | Value |
|---|---|---|
| /FormCache | Integer | 0-Behave according to Adobe specification of execform (the default)<br>1-Behave according to VIPP specification of execform. The form dictionary has been created "on-the-fly" during the current job. If one of the cached images associated with this form matches the current rotation/scale parameters of the CTM use it otherwise execute the PaintProc to create a new image and cache it. In both cases put the form image in the current page buffer.<br>2-Behave according to VIPP specification of execform. The form dictionary has been created by findresource after accessing a pre-cached form on external storage. If one of the pre-cached images associated with this form matches the current rotation/scale parameters of the CTM use it otherwise execute the PaintProc to create a new image and add it to the form object on external storage. In both cases put the form image in the current page buffer. |
| /FormName | nametype | A name uniquely identifying the form inside an organization. The same name will be used by defineresource to register the form. (only relevant with FormCache = 1 or 2) |
| /Source | string | Full path to the source file (in appropriate format for the underlying file system). This path is used by the PaintProc to locate the file (only relevant with FormCache = 2) |
| /Rendering | array | An array of even length containing a list of number pairs representing the required rotation/scale combinations at pre-rendering time. (only relevant with FormCache = 2) |

Note that cached images created by execform with /FormCache=1 will all be discarded at the end of the job. On the opposite all additional images created by execform with /FormCache=2 will be added to the form object on external storage so it can cross job boundary and be reused by subsequent jobs.

defineresource. Depending of the value of the FormCache key present in the form dictionary defineresource will have two different behaviors:

FormCache=0 or 1: defineresource registers the resource in VM. On that point the expected behavior is the one described by Adobe.

FormCache=2: defineresource registers the resource on external storage. Adobe does not provide a syntax to pre-cache and store a form on external storage. For this the VIPP specifications defines the following behavior of defineresource when FormCache=2 is present in the form dictionary:

Check if the form already exists as a pre-cached object on external storage. If yes delete all its components.

Create a pre-cached object on external storage made of the following components:
- the file referenced by the /Source key. It is important that this file be copied (duplicated) into a location that is part of the pre-cached object and not accessible to the user. This is to prevent substitution of this file by another that would not match anymore with the pre-rendered images.
- all pre-rendered images created by execution of the PaintProc using the list of rotation/scale combinations provided by /Rendering.
- the form dictionary with the /Source key modified to reference the new location of the file. In that case the form will not be registered in VM and no image will be put in the current page buffer. The form is likely to be printed later by another job that will access it using findresource and print it using execform.

The following is an example of PostScript code sent to the interpreter to request permanent caching of an EPS file called "car1.eps":

/car1.eps
<</FormType 1
/BBox [extracted from car1.eps]
/Matrix[1 0 0 1 0 0]
/PaintProc {/Source get run }
/FormCache 2
/FormName /car1.eps
/Source (xgfc/formlib/car1.eps)
/Rendering [0 1 90 1 0.5 90.5]
>>/Form defineresource pop In any case it is important that the implementation be transparent to the user. A job using the VIPP caching feature must always produce the same output regardless of the level of implementation. The only noticeable difference should be the processing time.

While certain exemplary embodiments of the invention have been described in detail above, it should be recognized that other forms, alternatives, modifications, versions and variations of the invention are equally operative and would be apparent to those skilled in the art. Accordingly, the true scope of the invention is intended to cover all alternatives, modifications, and equivalents and should be determined with reference to the claims set forth below.

What is claimed:

1. A system for enabling implementation-transparent caching of reusable objects in an application program using a language with defined operators, each defined operator having a set of application-defined operations associated with it, comprising:
   a memory storing a defined operator from the language which supports a set of application-defined caching operations; a set of new caching operations having new functionality for use in a specific caching implementation, wherein the set of new caching operations is associated with the defined operator; and a key for selecting between the set of application-defined caching operations and the set of new caching operations; and
   a processor for executing the application program, wherein, upon execution of the application program, the application program automatically selects the set of application-defined caching operations or the set of new caching operations based on the value of the key.

2. The system of claim 1, wherein the language comprises a page description language.

3. The system of claim 2, wherein the page description language comprises Adobe PostScript.

4. The system of claim 3, wherein the set of application-defined caching operations comprise defineresource, resourcestatus, findresource and execform.

5. The system of claim 2, wherein the set of new caching operations comprise using an external resource.

6. The system of claim 2, wherein the set of new caching operations comprise permanently storing a reusable object for reuse across multiple jobs.

7. The system of claim 2, wherein the set of new caching operations comprises enabling modifications of a reusable object.

8. The system of claim 7, wherein the modifications comprise scaling and rotation.

9. A method for enabling implementation-transparent caching of reusable objects in an application program using a language with defined operators, each defined operator having a set of application-defined operations associated with it, comprising:

selecting a defined operator from the language which supports a set of application-defined caching operations;

creating a set of new caching operations having new functionality for use in a specific caching implementation;

associating the set of new caching operations with the defined operator; and defining a key for selecting between the set of application-defined caching operations and the set of new caching operations;

wherein, upon execution of the application program, the application program automatically selects the set of default caching operations or the set of additional caching operations based on the value of the key.

10. The method of claim 9, wherein the language comprises a page description language.

11. The method of claim 10, wherein the page description language comprises Adobe PostScript.

12. The method of claim 11, wherein the set of application-defined caching operations comprise defineresource, resourcestatus, findresource and execform.

13. The method of claim 10, wherein the set of new caching operations comprise using an external resource.

14. The method of claim 10, wherein the set of new caching operations comprise permanently storing a reusable object for reuse across multiple jobs.

15. The method of claim 10, wherein the set of new caching operations comprises enabling modifications of a stored reusable object.

16. The method of claim 15, wherein the modifications comprise scaling and rotation.

* * * * *